US012567649B2

(12) United States Patent
Hwang

(10) Patent No.: US 12,567,649 B2
(45) Date of Patent: Mar. 3, 2026

(54) BATTERY MODULE AND ENERGY STORAGE SYSTEM INCLUDING THE SAME

(71) Applicant: SAMSUNG SDI CO., LTD., Yongin-si (KR)

(72) Inventor: Tae Sin Hwang, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 91 days.

(21) Appl. No.: 18/195,523

(22) Filed: May 10, 2023

(65) Prior Publication Data

US 2023/0369717 A1    Nov. 16, 2023

(30) Foreign Application Priority Data

May 11, 2022    (KR) ......................... 10-2022-0057811

(51) Int. Cl.
H01M 50/383        (2021.01)
H01M 50/209        (2021.01)
                        (Continued)

(52) U.S. Cl.
CPC ....... H01M 50/383 (2021.01); H01M 50/209 (2021.01); H01M 50/262 (2021.01);
                        (Continued)

(58) Field of Classification Search
CPC ............. H01M 50/143; H01M 50/383; H01M 50/209; H01M 50/262; H01M 50/271; H01M 50/673; H01M 50/24; H01M 50/358; H01M 50/30; H01M 50/273;

H01M 50/204; H01M 50/244; H01M 50/258; H01M 50/242; H01M 10/6556; H01M 10/613; H01M 10/655; H01M 10/6568; H01M 10/60; H01M 10/6551; H01M 10/656; H01M 10/6569
See application file for complete search history.

(56) References Cited

U.S. PATENT DOCUMENTS

| | | | | | |
|---|---|---|---|---|---|
| 5,607,787 A | * | 3/1997 | Wedlake | .................. | A62C 3/16 |
| | | | | | 429/62 |
| 2010/0136391 A1 | * | 6/2010 | Prilutsky | ........... | H01M 10/6566 |
| | | | | | 429/62 |

(Continued)

FOREIGN PATENT DOCUMENTS

| | | | | |
|---|---|---|---|---|
| CN | 109985335 A | | 7/2019 | |
| CN | 111584792 A | * | 8/2020 | ............... A62C 3/16 |

(Continued)

OTHER PUBLICATIONS

CN111584792A translation (Year: 2020).*
European Search Report dated Nov. 29, 2023, of the European Patent Application No. 23172662.1.

*Primary Examiner* — Helen Oi K Conley
*Assistant Examiner* — Amanda Rosenbaum
(74) *Attorney, Agent, or Firm* — Lee IP Law, P.C.

(57) ABSTRACT

A battery module comprising a tray having an opening and having an accommodation space therein, a plurality of battery cells accommodated in the tray, a cover coupled to an upper portion of the tray to close the opening, and a conduit shaped to correspond to an arrangement of the plurality of battery cells on a surface of the cover facing the plurality of battery cells.

13 Claims, 8 Drawing Sheets

(51) Int. Cl.
    *H01M 50/262*     (2021.01)
    *H01M 50/271*     (2021.01)
    *H01M 50/673*     (2021.01)

(52) U.S. Cl.
    CPC ....... H01M 50/271 (2021.01); H01M 50/673
        (2021.01); *H01M 2200/00* (2013.01)

(56)         References Cited

U.S. PATENT DOCUMENTS

| | | | |
|---|---|---|---|
| 2013/0264077 A1 | 10/2013 | Jung | |
| 2014/0329115 A1* | 11/2014 | Fink | H01M 50/3425 |
| | | | 429/56 |
| 2015/0140369 A1* | 5/2015 | Itoi | H01M 50/204 |
| | | | 429/53 |
| 2016/0059056 A1* | 3/2016 | Hoffman, III | A62C 3/002 |
| | | | 169/58 |
| 2018/0331401 A1* | 11/2018 | Glass | H01M 10/613 |
| 2019/0077276 A1* | 3/2019 | Capati | H05K 7/20872 |
| 2021/0367286 A1* | 11/2021 | Guo | H01M 10/6568 |

| | | | |
|---|---|---|---|
| 2022/0118861 A1* | 4/2022 | Zeng | H01M 10/6567 |
| 2022/0123383 A1 | 4/2022 | Lee et al. | |
| 2022/0123430 A1* | 4/2022 | Liang | H01M 50/375 |
| 2022/0273975 A1* | 9/2022 | Svensson | H01M 10/0525 |
| 2022/0359947 A1* | 11/2022 | Lee | A62C 3/16 |
| 2024/0014507 A1* | 1/2024 | Kim | H01M 50/20 |

FOREIGN PATENT DOCUMENTS

| | | | | |
|---|---|---|---|---|
| CN | 113764772 A | 12/2021 | | |
| EP | 3761430 A1 | 7/2019 | | |
| JP | 2019-075191 A | 5/2019 | | |
| KR | 10-2123685 B1 | 6/2020 | | |
| KR | 2149439 B1 * | 8/2020 | .............. | A62C 3/16 |
| KR | 10-2021-0076261 A | 6/2021 | | |
| KR | 10-2022-0027937 A | 3/2022 | | |
| KR | 2022027937 A * | 3/2022 | .............. | A62C 3/16 |
| KR | 2022051758 A * | 4/2022 | .............. | A62C 5/02 |
| KR | 2022051890 A * | 4/2022 | .............. | A62C 3/16 |
| WO | WO 2021/194059 A1 | 9/2021 | | |
| WO | WO 2022/086060 A1 | 4/2022 | | |

* cited by examiner

BATTERY MODULE AND ENERGY STORAGE SYSTEM INCLUDING THE SAME

CROSS-REFERENCE TO RELATED APPLICATION

Korean Patent Application No. 10-2022-0057811, filed on May 11, 2022, in the Korean Intellectual Property Office, is herein incorporated by reference in its entirety.

BACKGROUND

1. Field

A battery module and energy storage system including the same is disclosed.

2. Description of the Related Art

An energy storage system is a system that can store surplus electricity or use renewable energy to store electricity produced.

SUMMARY

Embodiments are directed to a battery module including a tray having an opening and having an accommodation space therein, a plurality of battery cells accommodated in the tray, a cover coupled to an upper portion of the tray to close the opening; and a conduit shaped to correspond to an arrangement of the plurality of battery cells on a surface of the cover facing the plurality of battery cells.

Embodiments are directed to the battery module wherein the conduit is integrally formed with the cover.

Embodiments are directed to the battery module wherein the conduit is disposed at a position corresponding to a vent of each of the plurality of battery cells.

Embodiments are directed to the battery module wherein the conduit includes at one end an inlet exposed to the outside of the cover.

Embodiments are directed to the battery module wherein the conduit is disposed in a curved shape with respect to the area of the cover.

Embodiments are directed to the battery module wherein the cover includes a fixing part for fixing the conduit to a surface facing the plurality of battery cells.

Embodiments are directed to the battery module wherein the fixing part includes a deformable part having a relatively small thickness in an area corresponding to each of the plurality of battery cells to cover the conduits.

Embodiments are directed to the battery module wherein the cover further includes upper holes corresponding to grooves on an upper surface.

Embodiments are directed to an energy storage system including a fire-extinguishing chemical portion containing a fire-extinguishing chemical therein, a supply pipe connected to the fire-extinguishing chemical portion, and one or more battery racks including a plurality of battery modules connected to the supply pipe, wherein the supply pipe is connected to each of the plurality of battery modules through a flexible tube.

Embodiments are directed to the energy storage system wherein the supply pipe includes a module pipe portion formed along a direction in which the plurality of battery modules are stacked in the battery rack, the module pipe portion includes connectors corresponding to the plurality of battery modules, and the connectors are coupled to the flexible tube.

Embodiments are directed to the energy storage system wherein the fire-extinguishing chemical is a gas-based fire-extinguishing chemical such as trifluoromethane, pentafluoroethane, heptafluoropropane, or dodecafluoro-2-methylpentan-3-one.

Embodiments are directed to the energy storage system wherein the fire-extinguishing chemical may be stored in the chemical container in a pressure accumulator type or a pressurized type.

Embodiments are directed to the energy storage system wherein the fire-extinguishing chemical portion may be fixed to an installation site or fixed to a wall.

Embodiments are directed to the energy storage system wherein the fire-extinguishing chemical portion may be a pressure container for storing a high-pressure fire-extinguishing chemical.

BRIEF DESCRIPTION OF DRAWINGS

Features will become apparent to those of skill in the art by describing in detail exemplary embodiments with reference to the attached drawings in which.

DETAILED DESCRIPTION

Figure 1:
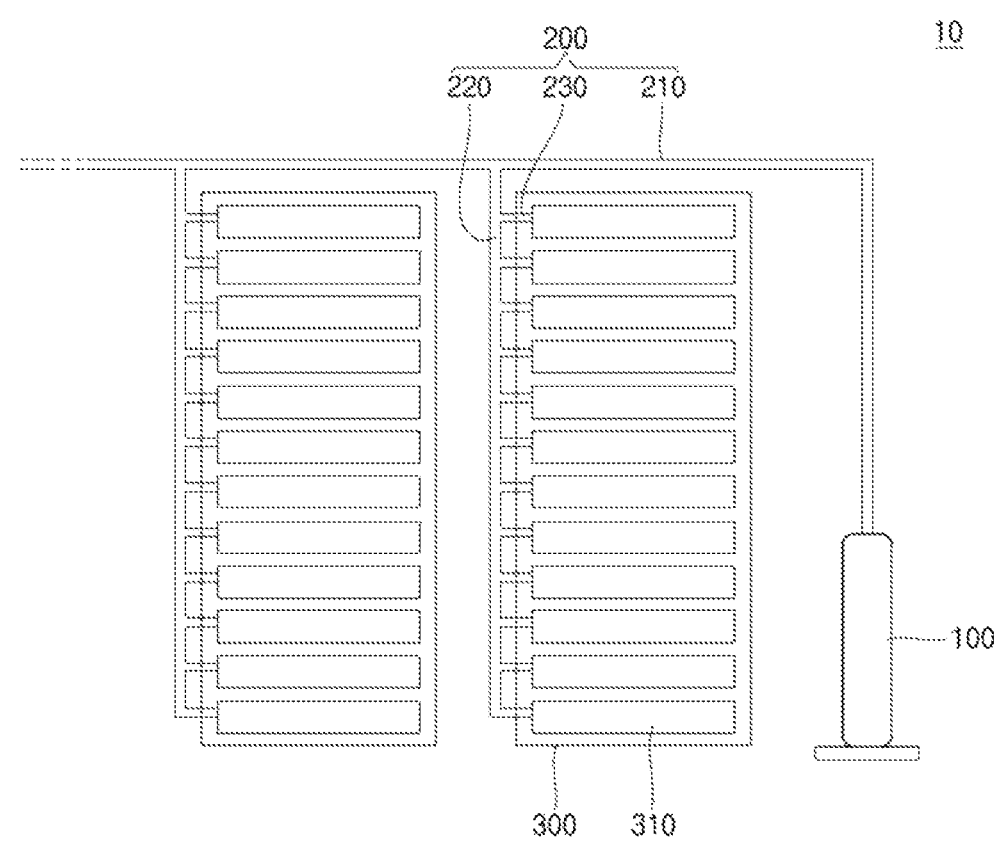
FIG. 1 is a conceptual diagram showing an example embodiment of a fire extinguishing system.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

In addition, a control unit (controller) and/or other related devices or components according to the present disclosure may be implemented using any suitable hardware, firmware (e.g., application specific semiconductor), software, or a suitable combination of software, firmware and hardware. For example, various components of the control unit and/or other related devices or parts according to the present disclosure may be on one integrated circuit chip or on separate integrated circuit chips. In addition, various components of the control unit may be implemented on a flexible printed circuit film, and may be on a tape carrier package, a printed circuit board, or the same substrate as the control unit. In addition, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

For example, the controller according to the present disclosure can be operated in a typical commercial computer which comprises a central processing unit, a mass storage device, such as a hard disk or a solid state disk, a volatile memory device, an input device, such as a keyboard or a mouse, and an output device, such as a monitor or a printer.

Hereinafter, an energy storage system according to an embodiment of the present disclosure will be described in detail with reference to the accompanying drawings.

FIG. 1 is a conceptual diagram showing an example embodiment of a fire extinguishing system. Referring to FIG. 1, the fire extinguishing system may include a fire-extinguishing chemical portion accommodating a fire-extinguishing chemical, a supply pipe 200 connected to the fire-extinguishing chemical portion 100 to supply a fire-extinguishing chemical, and one or more battery racks 300 connected to the supply pipe 200.

Here, the fire-extinguishing chemical portion 100 may include a chemical container containing a fire-extinguishing chemical, and when a valve is opened through a separate valve, the fire-extinguishing chemical may be supplied to the supply pipe 200. The chemical container may be fixed to an installation site in a package method or a wall fixing method. As an example, the chemical container may be a pressure container for storing a high-pressure fire-extinguishing chemical. The internal pressure of such a chemical container may vary depending on the country where the fire extinguishing system is applied or the type of fire-extinguishing chemical.

In addition, as the fire-extinguishing chemical stored in the chemical container, any commonly used fire-extinguishing chemical including a gas-based fire-extinguishing chemical such as trifluoromethane (HFC-23, $CHF_3$), pentafluoroethane (HFC-125, $C_2HF_5$), or heptafluoropropane (HFC227ea, $CF_3CHFCF_3$), dodecafluoro-2-methylpentan-3-one ($CF_3CF_2C(O)CF(CF_3)_2$), and/or water ($H_2O$), may be applied. The fire-extinguishing chemical may be stored in the chemical container in a pressure accumulator type or a pressurized type.

The supply pipe 200 may connect the fire-extinguishing chemical portion 100 and battery modules 310 in the battery racks 300, respectively. To this end, the supply pipe 200 may include a main pipe portion 210 connected to the fire-extinguishing chemical portion 100, a branched pipe portion 220 branching from the main pipe portion 210 to each of the battery racks 300, and a module pipe portion 230 connecting the branched pipe portion 220 and each of the battery modules 310 included in the battery racks 300 to each other.

The main pipe portion 210 may be formed such that one end thereof is connected to the fire-extinguishing chemical portion 100 and extends therefrom to pass through one side or near all the battery racks 300 in the energy storage system 10. Therefore, when the valve of the fire-extinguishing chemical portion 100 is opened, the fire-extinguishing chemical may be delivered to the vicinity of the battery rack 300 to which the fire-extinguishing chemical is to be supplied. In an implementation, when the valve of the fire-extinguishing chemical portion 100 is opened, the fire-extinguishing chemical may be delivered through the supply pipe 200, from the main pipe portion 210, then through the branched pipe portion and the module pipe portion 230 to supply the fire-extinguishing chemical to the battery rack 300 and battery modules 310 to which the fire-extinguishing chemical is to be supplied.

The branched pipe portion 220 may be branched from the main pipe portion 210, and specifically, may extend along the direction in which the battery modules 310 may be stacked within the battery rack 300. The branched pipe portion 220 may provide a path for transporting a fire-extinguishing chemical, which has moved to the vicinity of the battery rack 300 along the main pipe portion 210, to the battery module 310 in the battery rack 300.

Meanwhile, the module pipe portion 230 may connect the branched pipe portion 220 and each of the battery modules 310. The module pipe portion 230 may allow the fire-extinguishing chemical of the branched pipe portion 220 to be supplied to a conduit formed in the battery module 310. The configuration of the module pipe portion 230 will be described again later.

The battery rack 300 may include a plurality of battery racks, and each of the battery racks may include a plurality of battery modules 310. In addition, within each of the battery racks 300, the battery modules 310 may be stacked in one direction, e.g., along a vertical direction. Such battery modules 310 may produce a desired output by being connected in series, parallel or series-parallel.

Hereinafter, coupling of the branched pipe portion 220 and the battery module 310 in an energy storage system according to an example embodiment of the present disclosure will be described in detail.

Figure 2:
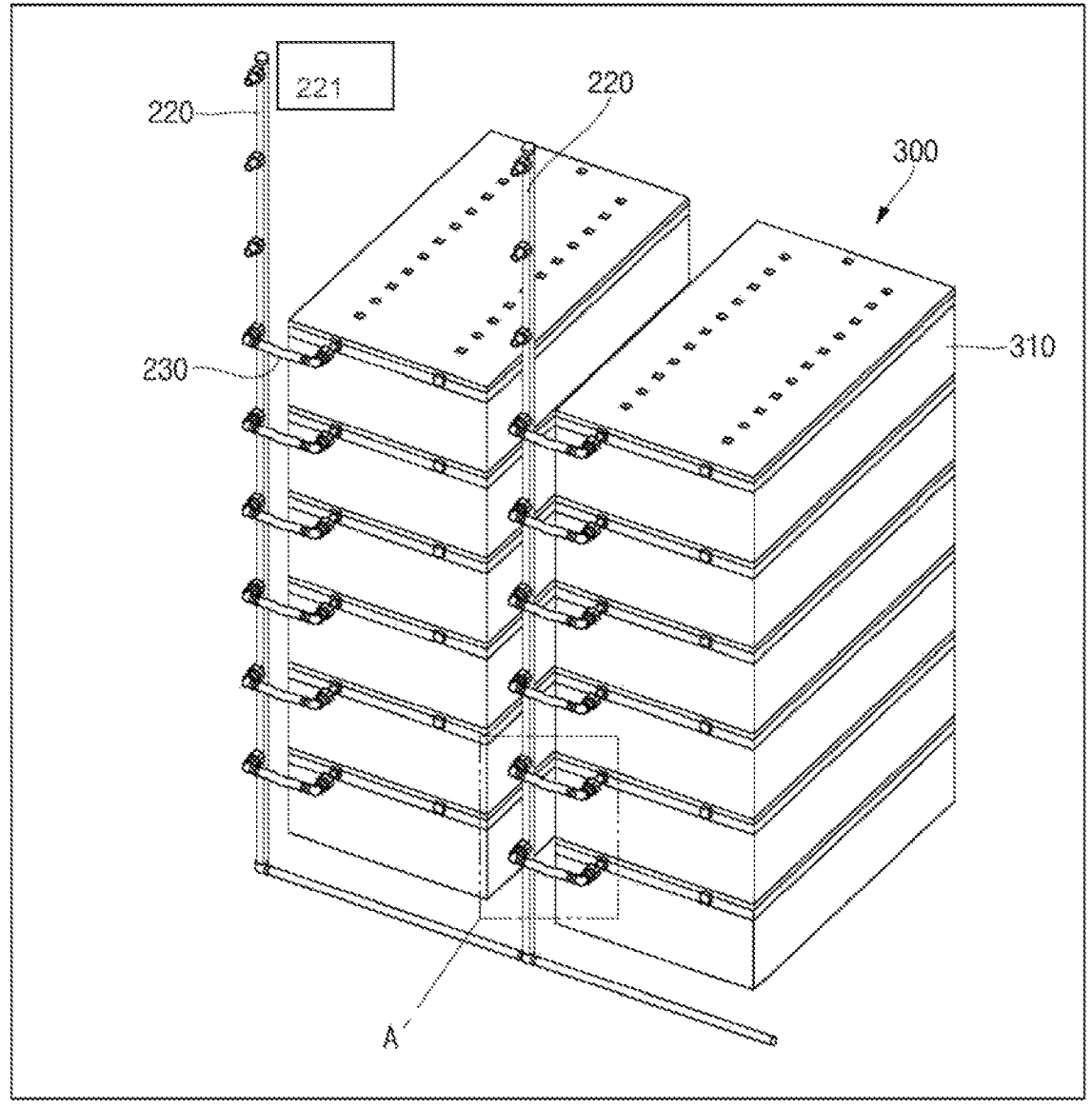
FIG. 2 is a perspective view showing a state in which battery modules are coupled to an extinguishing agent pipe in an energy storage system.
Figure 3:
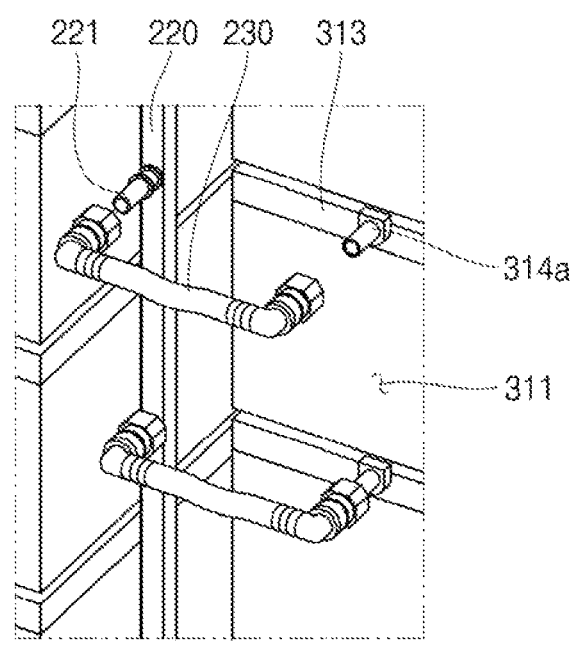
FIG. 3 is an enlarged view of part A of FIG. 2.

FIG. 2 is a perspective view showing a state in which battery modules are coupled to an extinguishing agent pipe in an energy storage system. FIG. 3 is an enlarged view of part A of FIG. 2.

Referring to FIGS. 2 and 3, the branched pipe portion 220 may include connectors 221 along the vertical direction in which the respective battery modules 310 may be stacked. In an implementation, the position of each of the connectors 221 may correspond to the position of each of the battery modules 310 in the vertical direction. In addition, as will be described later, in the battery module 310, a conduit 314 may be formed inside the cover 313, and the inlet 314a of the conduit 314 may protrude out of the cover 313 and may be exposed.

In addition, the module pipe portion 230 may connect the connector 221 of the branched pipe portion 220 and the inlet 314a of the conduit 314 of each battery module 310 to each other. The module pipe portion 230 may be provided as a flexible tube, and accordingly, even when there is a variation for each battery module 310 in the distance between the connector 221 and the inlet 314a, or the height, the module pipe portion 230 can flexibly connect the connector 221 and the inlet 314a to each other. Hereinafter, a configuration of a battery module in an energy storage system according to an embodiment of the present disclosure will be described.

Figure 4:
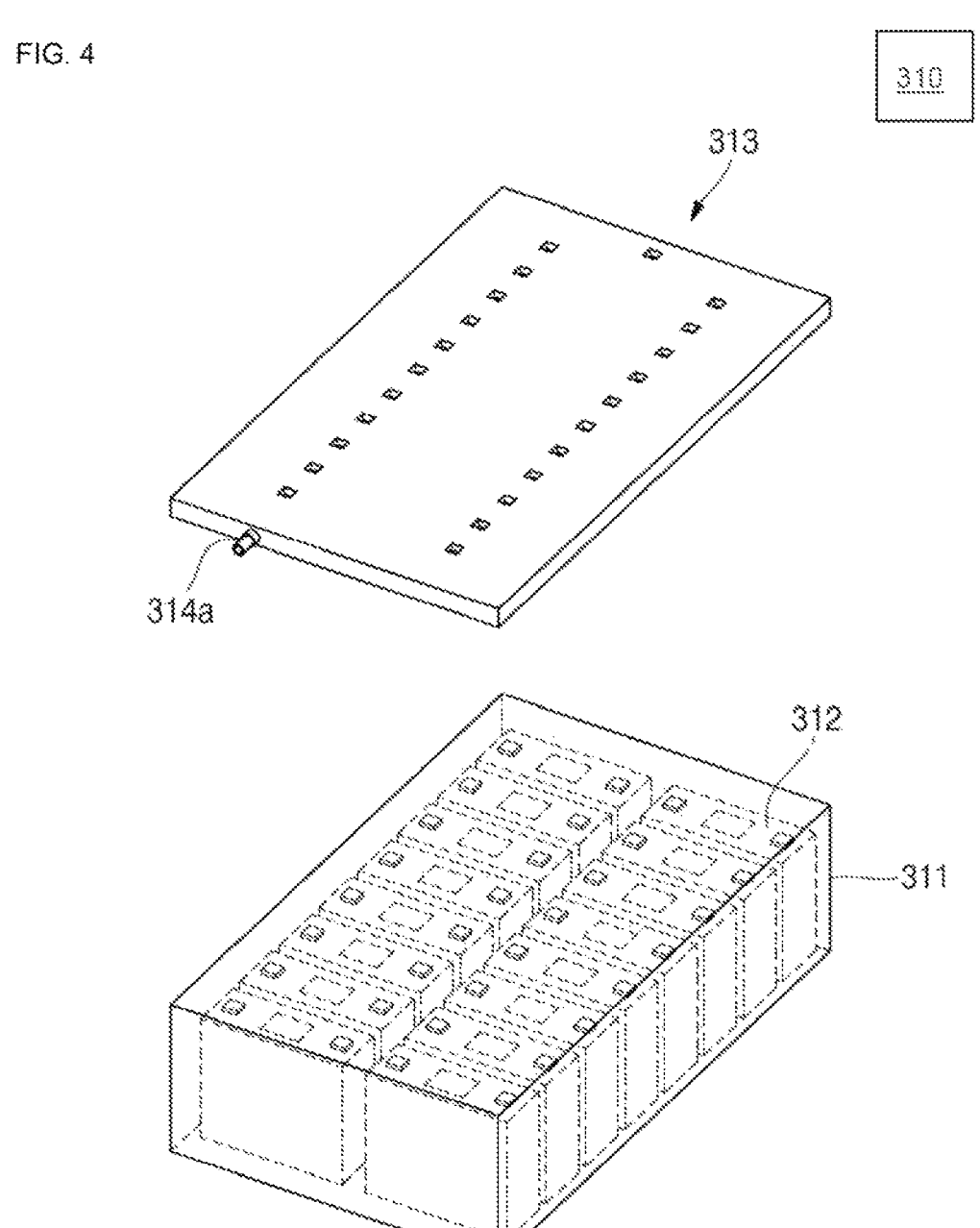
FIG. 4 is an exploded perspective view showing a cover of a battery module being separated from an energy storage system.
Figure 5A:
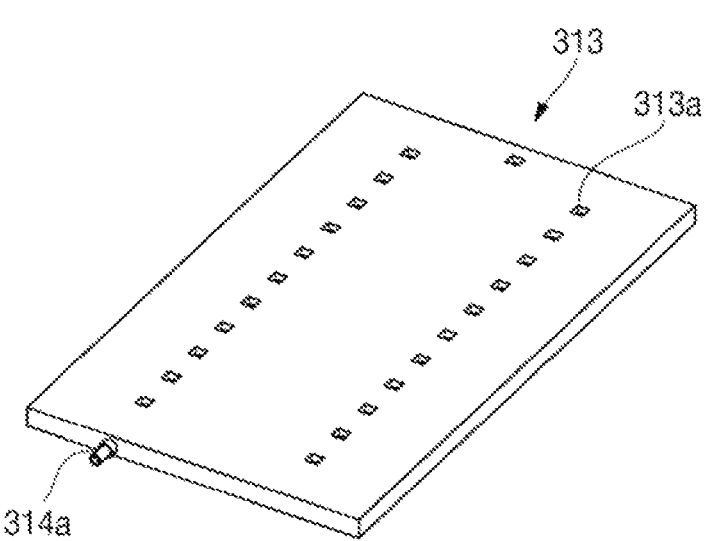
FIG. 5A is a perspective view showing a cover of a battery module in an energy storage system.
Figure 5B:
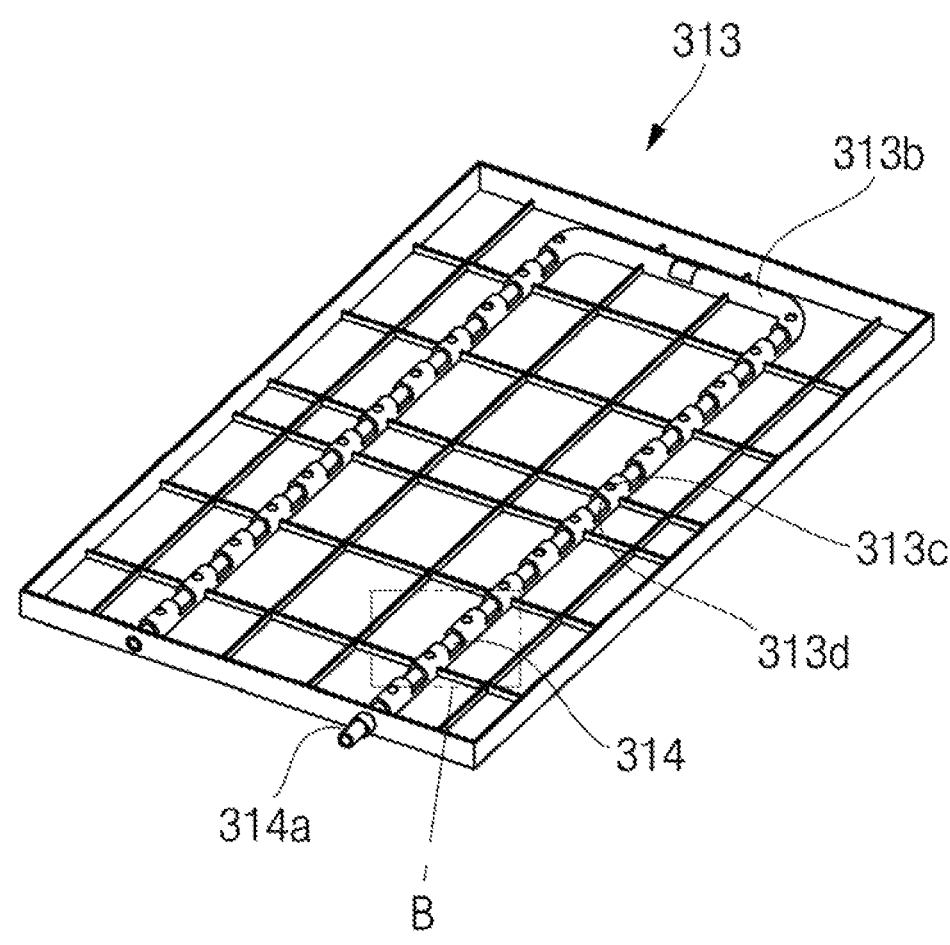
FIG. 5B is a bottom perspective view showing a cover of a battery module in an energy storage system.
Figure 5C:
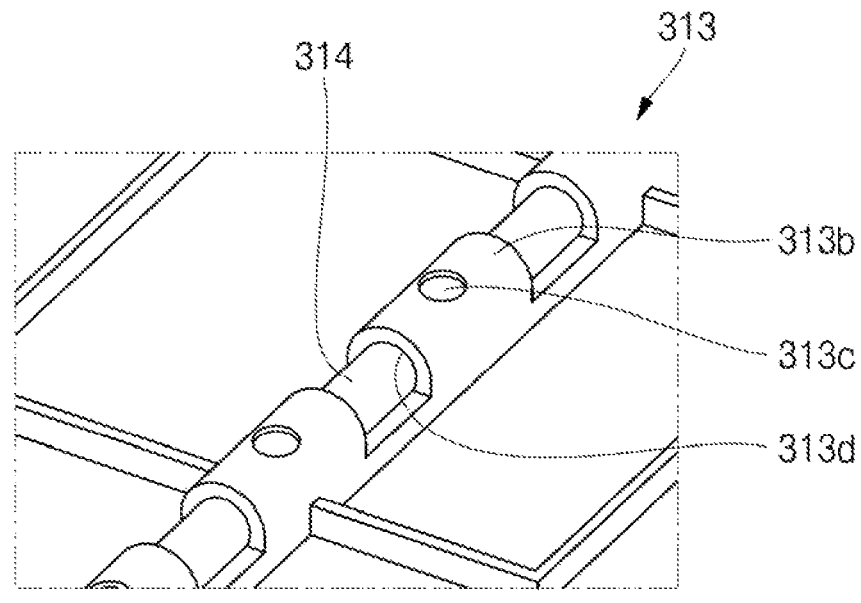
FIG. 5C is an enlarged view of part B of FIG. 5B.
Figure 5D:
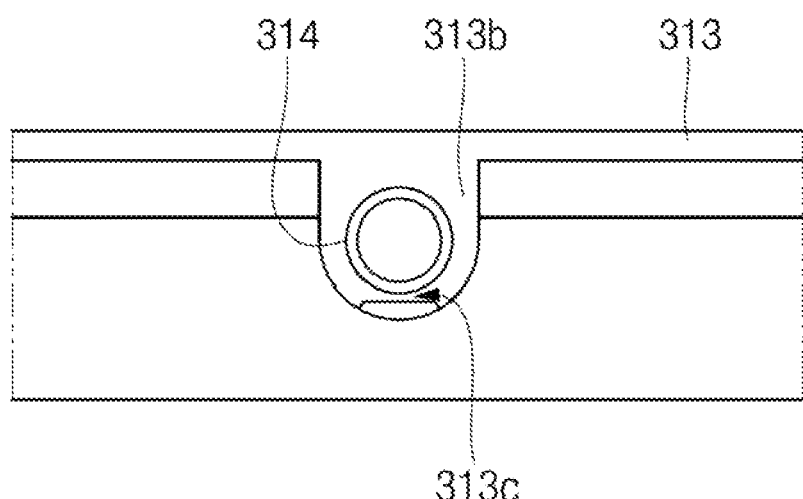
FIG. 5D is a partial cross-sectional view showing a state in which a cover of a battery module is coupled in an energy storage system.

FIG. 4 is an exploded perspective view showing a cover of a battery module being separated from an energy storage system. FIG. 5A is a perspective view showing a cover of a battery module in an energy storage system. FIG. 5B is a bottom perspective view showing a cover of a battery module in an energy storage system. FIG. 5C is an enlarged view of part B of FIG. 5B. FIG. 5D is a partial cross-sectional view showing a state in which a cover of a battery module is coupled in an energy storage system.

Referring first to FIG. 4, the battery module 310 may include a tray 311, a battery cell 312, and a cover 313. Here, the tray 311 has an opening formed therein and has an accommodating space therein, and thus, a plurality of battery cells 312 may be arranged in the accommodating space.

As shown, the battery cells 312 may be arranged in two rows, and may be arranged in various forms according to the selection made by a person skilled in the art. In addition, each of the battery cells 312 may be electrically connected to each other, and a connection method may also be achieved in various ways including, e.g., in series, in parallel, and in series/parallel.

The cover 313 may be coupled to an upper portion of the tray 311 to seal the opening of the tray 311. A detailed structure of the cover 313 will be described with reference to FIGS. 5A to 5D.

As shown in FIG. 5A, the cover 313 may have a plurality of upper holes 313a formed therein. The upper holes 313a may correspond to the conduit 314 on the lower surface of the cover 313 shown in FIG. 5B. The upper holes 313a of the cover 313 may correspond to a deformable part 313c of a fixing part 313b for fixing the conduit 314, which will be described later. Therefore, in a situation in which gas spreads within the battery module 310 due to the opening of a vent despite fire extinguishing in a battery cell 312 where an event has occurred, the gas may be discharged to the outside of the battery module 310 through the corresponding hole 313a. Thus, it is possible to prevent a chain reaction of the battery cells 312.

The conduit 314 may be provided in a curved shape along the lower surface of the cover 313. In an implementation, the conduit 314 may be provided in a substantially "U" shape along the lower surface of the cover 313. The inlet 314a located at one end of the conduit 314 may be exposed by protruding to one side of the cover 313, and as described above, the fire-extinguishing chemical may be supplied through the module pipe portion 230 connected to the inlet 314a. Each one of the inlet 314a may be provided for each conduit 314, and the fire-extinguishing chemical supplied through the inlet 314a may be injected and consumed only within the corresponding conduit 314, rather than circulating to other battery modules 310.

In addition, the conduit 314 may have a hole formed in advance so as to correspond to the position of a vent of each of the battery cells 312. The hole of the conduit 314 may be covered by the fixing part 313b as will be described later. However, when the corresponding area of the fixing part 313b is opened by the gas ejected through the vent of the specific battery cell 312, the hole of the conduit 314 may be situated so that the fire extinguishing liquid may be injected into the battery cell 312 where the event occurs.

In an implementation, the conduit 314 may be fixed to the cover 313 by the fixing part 313b located on a lower surface of the cover 313. The fixing part 313b may have a relatively thin deformable part 313c corresponding to the position of a vent of each of the battery cells 312, and the hole of the conduit 314 may be covered through the deformable part 313c. Therefore, since the hole of the conduit 314 may not be exposed to the outside at normal times, the fire-extinguishing chemical inside the conduit 314 can only be located inside the conduit. However, when the relatively thin deformable part 313c is melted by gas ejected from the vent of the battery cell 312, the hole of the conduit 314 is exposed, and thus, the fire-extinguishing chemical can be directly injected into the vent of the battery cell 312.

Although the deformable part 313c has been described as being melted by the heat of the gas, the deformable part 313c can be deformed in various forms, such as being ruptured by the heat of the gas, depending on the design, to expose the hole of the conduit 314.

The structures of the conduit 314 and the cover 313 may be manufactured through insert-injection molding. In an implementation, the conduit 314 may be manufactured in advance, and in a state in which the conduit 314 is fixed through a separate clamp during manufacture of the cover 313, by performing insert-injection, the cover 313 and the conduit 314 may be formed in an integral structure. In the drawings, the hole 313d formed in the cover 313 to expose the conduit 314 may be a region where the conduit 314 is gripped by a separate clamp during insert-injection. According to this structure, the position of the conduit 314 can be fixed within the cover 313, and the battery module 310 can be completed through a simple operation of coupling the cover 313 to the tray 311 containing the battery cells 312. Therefore, the conduit 314 may not be damaged during transportation or handling, and the conduit 314 can be placed at an accurate position relative to for the battery cell 312 without requiring a separate assembling operation.

The conduit 314 may be assembled in a state in which the fixing part 313b may be pre-manufactured on the cover 313, or the fixing part 313b may be assembled on the lower surface of the cover 313 in a state in which the fixing part 313b and the conduit are coupled to each other.

In addition, the hole of the conduit 314 covered by the deformable part 313c may be located above the vent of each battery cell 312, and thus, when an event such as ignition or opening of a vent due to an increase in internal pressure occurs in a specific battery cell 312, the deformable part 313c of the conduit 314 located on the top of the corresponding battery cell 312 may be melted by the heat of the battery cell 312.

Eventually, when the valve of the fire-extinguishing chemical portion 100 is opened by the operation of a controller, the fire-extinguishing chemical may be supplied through the main pipe portion 210, the branched pipe portion 220, the module pipe portion 230, and the conduit 314, and the fire-extinguishing chemical may be injected toward the battery cell 312 through the hole of the conduit 314 at a position corresponding to the deformable part 313c of the conduit 314, which may be melted by heat. As a result, efficient and sustainable fire-extinguishing can be achieved by concentrating the fire-extinguishing chemical on the battery cell 312 where the event has occurred.

As described above, in the energy storage system 10 according to an embodiment of the present disclosure, by integrally manufacturing the cover 313 constituting the battery module 310 with the conduit 314 through insert-injection, the position of the conduit 314 can be fixed within the cover 313, and the conduit 314 can be prevented from being damaged during transportation or handling of the conduit 314.

As described above, in the energy storage system according to an embodiment of the present disclosure, by integrally forming a cover constituting a battery module with a conduit through insert-injection, the conduit can be fixed in position within the cover and the conduit can be prevented from being damaged during transportation or handling.

By way of summation and review, a battery module capable of preventing a conduit for injecting a fire-extinguishing chemical from being damaged during transportation and handling is disclosed. By using the energy storage system, idle power can be stored during times of low electricity demand and electricity can be supplied during times of high electricity demand, thereby smoothly controlling power supply and demand.

In a space or facility where the energy storage system is installed and operated, it is mandatory to have equipment for controlling a battery fire which may occur due to a fire caused by electric shock, short circuit, and/or external surge. A general fire extinguishing system may consist of a fire detection sensor, a sprinkler installed around a battery rack or a ceiling, a fire-extinguishing chemical injector.

The fire extinguishing system is of an indirect injecting type, in which, in an event of a battery fire, water or a fire-extinguishing chemical is injected close to a battery or over the entire area where the battery is installed. However, as the energy density of a battery continues to increase, the flame amount and injecting pressure are rising at a vent of a battery cell, and thus it is difficult to suppress or control the fire at an early stage by using general fire suppression equipment. Therefore, there is gradually an increasing demand for a fire extinguishing system capable of effectively suppressing fires of multiple batteries and extinguishing a high-pressure fire at an early stage.

The present disclosure provides a battery module capable of preventing a conduit for injecting a fire-extinguishing chemical from being damaged during transportation and handling, and an energy storage system including the same.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:

a tray having an opening and having an accommodation space therein;

a plurality of battery cells accommodated in the tray;

a cover coupled to an upper portion of the tray to close the opening; and a conduit shaped to correspond to an arrangement of the plurality of battery cells only on a surface of the cover facing the plurality of battery cells, wherein the conduit is U-shaped with two side portions thereof opposite each other running a length of the cover and an end portion connecting the two side portions, wherein:

the cover includes a sleeve holding the conduit therein, a lower surface of the cover facing the plurality of battery cells;

the sleeve includes open portions exposing the conduit, the sleeve is form fitted around and concentric with the conduit, the sleeve includes a deformable part in an area above each of the plurality of battery cells to cover the conduit, the deformable part is deformable by gas produced by a battery cell of the plurality of battery cells, the conduit comprises a hole corresponding to a vent position of the battery cell, the deformation part corresponds to the hole of the conduit, and a thickness of the deformation part is smaller than that of other regions of the sleeve.

2. The battery module as claimed in claim 1, wherein the conduit is integrally formed with the cover.

3. The battery module as claimed in claim 1, wherein the conduit is disposed at a position corresponding to a vent of each of the plurality of battery cells.

4. The battery module as claimed in claim 1, wherein the conduit includes at one end an inlet exposed to the outside of the cover.

5. The battery module as claimed in claim 4, wherein the conduit is disposed in a curved shape with respect to an area of the cover.

6. The battery module as claimed in claim 1, wherein the cover further includes upper holes corresponding to grooves on an upper surface of the cover.

7. An energy storage system, comprising:

a fire-extinguishing chemical portion containing a fire-extinguishing chemical therein;

a supply pipe connected to the fire-extinguishing chemical portion; and one or more battery racks including a plurality of the battery module as claimed in claim 1 connected to the supply pipe, wherein the supply pipe is connected to each of the plurality of battery modules through a flexible tube.

8. The energy storage system as claimed in claim 7, wherein:

the supply pipe includes a module pipe portion formed along a direction in which the plurality of battery modules are stacked in the battery rack, the module pipe portion includes connectors corresponding to the plurality of battery modules, and the connectors are coupled to the flexible tube.

9. The energy storage system as claimed in claim 7, wherein the fire-extinguishing chemical is a gas-based fire-extinguishing chemical, the gas-based fire-extinguishing chemical including trifluoromethane, pentafluoroethane, heptafluoropropane, or dodecafluoro-2-methylpentan-3-one.

10. The energy storage system as claimed in claim 7, wherein the fire-extinguishing chemical is stored in the chemical container in a pressure accumulator type or a pressurized type.

11. The energy storage system as claimed in claim 7, wherein the fire-extinguishing chemical portion is fixed to an installation site or fixed to a wall.

12. The energy storage system as claimed in claim 11, wherein the fire-extinguishing chemical portion is a pressure container for storing a high-pressure fire-extinguishing chemical.

13. The battery module as claimed in claim 1, wherein the conduit includes a single U-shaped structure having each of the side portions along a majority length of the cover in a longitudinal direction of the cover.

* * * * *